United States Patent [19]

Suenobu et al.

[11] 4,404,352
[45] Sep. 13, 1983

[54] METHOD OF PRODUCING POLYURETHANES

[75] Inventors: Koreyoshi Suenobu, Buzen; Masanori Kohara, Nakatsu; Yasuhiro Hidaka, Sakai; Kazuki Katsuyama, Nara; Ryoichi Kinishi, Yoshitomimachi, all of Japan

[73] Assignee: Yoshitomi Pharmaceutical Industries, Ltd., Osaka, Japan

[21] Appl. No.: 405,959
[22] PCT Filed: Dec. 17, 1981
[86] PCT No.: PCT/JP81/00393
 § 371 Date: Aug. 4, 1982
 § 102(e) Date: Aug. 4, 1982
[87] PCT Pub. No.: WO82/02203
 PCT Pub. Date: Jul. 8, 1982

[30] Foreign Application Priority Data

Dec. 22, 1980 [JP] Japan .................................. 55-182374
Apr. 17, 1981 [JP] Japan .................................. 56-58963
Jul. 14, 1981 [JP] Japan .................................. 56-110595
Jul. 17, 1981 [JP] Japan .................................. 56-112565

[51] Int. Cl.³ ............................................. C08G 18/80
[52] U.S. Cl. ....................................................... 528/45
[58] Field of Search ............................................ 528/45

[56] References Cited

U.S. PATENT DOCUMENTS 3,676,402  7/1972  Matsui et al. ........................ 528/45
3,833,525  9/1974  Orlando et al. ...................... 528/45
4,322,519  3/1982  Suenobu et al. .

Primary Examiner—Maurice J. Welsh
Attorney, Agent, or Firm—Wenderoth, Lind & Ponack

[57] ABSTRACT

The use of catalytically effective amounts of a specific organotin compound and a specific amine compound in the production of polyurethanes by reacting an at least partially blocked isocyanate compound with an active hydrogen-containing compound significantly lowers the baking temperature and gives cured coatings with a smooth surface and good performance.

12 Claims, No Drawings

METHOD OF PRODUCING POLYURETHANES

TECHNICAL FIELD

This invention relates to a method of producing polyurethanes, especially for coating purposes.

BACKGROUND OF THE INVENTION

In the conventional processes for producing polyurethanes in the form of coatings using blocked isocyanate compounds, high-temperature baking is required. Therefore, in coating thin steel sheets, there arise such problems as deformation of the steel sheets themselves, melting of solders and excessive energy consumption.

For solution of these problems, there have been proposed such deblocking temperature lowering catalysts for blocked isocyanate compounds as tetrabutyl-1,3-diacetoxydistannoxane, tetrabutyl-1,3-diphenoxydistannoxane, tetrabutyl-1,3-dibenzyloxydistannoxane, dibutyltin oxide, dibutyltin dilaurate and tetrabutyltin as disclosed in, for example, Japanese Patent Publication No. 18877/1969 and Japanese Patent Applications laid open (Kokai) under Nos. 42528/1977, 138434/1978 and 138435/1978. However, the effects of these compounds are still unsatisfactory. More efficient catalysts are demanded.

DISCLOSURE OF THE INVENTION

As a result of intensive research by the present inventors, it has now been found that the combined use of at least one mono- or di-organotin compound and a specific amine compound produces still higher catalytic effects as compared with the single use of the organotin compound alone.

Thus, the present invention relates to a method of producing polyurethanes by reacting an at least partially blocked isocyanate compound with an active hydrogen-containing compound in the presence of at least one compound selected from the group consisting of a dialkyltin compound, a diaryltin compound, a monoalkyltin compound and a monoaryltin compound and at least one amine compound selected from the group consisting of 1,10-phenanthroline, bipyridyl, 4,4'-dimethyl-2,2'-bipyridyl, 2,4,6-tris(dimethylaminomethyl)phenol, a morpholine compound, a piperidine compound and an alkanolamine compound of the formula

$$(R)_{3-n}N(CH_2CH_2OH)_n \quad (I)$$

wherein R is hydrogen, alkyl having 1 to 4 carbon atoms (e.g. methyl, ethyl, propyl, isopropyl, butyl or tert-butyl), phenyl or a group of the formula -$(CH_2)_m NH_2$ wherein m is an integer of 1 to 8, and n is an integer of 1 to 3, and wherein two Rs may be different when n is the integer 1.

The blocked isocyanate compound to be used in practicing the invention includes adducts of polyisocyanate compounds with isocyanate-blocking agents in theoretically calculated weight ratios. Examples of the polyisocyanate compounds, which may be of aromatic, alicyclic or aliphatic series, are tolylene diisocyanate, xylylene diisocyanate, phenylene diisocyanate, bis-(isocyanatomethyl)cyclohexane and tetramethylene diisocyanate, and terminal isocyanato group-containing compounds obtained by reacting an excess of any of such polyisocyanates with an active hydrogen-containing low-molecular-weight compound such as ethylene glycol, propylene glycol, trimethylolpropane, hexanetriol and castor oil.

The isocyanate-blocking agents are, for example, phenols (e.g. phenol, m-cresol, xylenol or thiophenol), alcohols (e.g. methanol, ethanol, butanol, 2-ethylhexanol, cyclohexanol, 2-methoxyethanol or 2-ethoxyethanol), and other active hydrogen-containing compounds such as ethyl acetoacetate and diethyl malonate.

Examples of the active hydrogen-containing compound, another basic starting material for producing polyurethanes, are polyether polyols, polyester polyols, polyurethane polyols and epoxy group-containing polyols.

The alkyltin compound, diaryltin compound, monoalkyltin compound and monoaryltin compound to be employed in the practice of the invention include, but are not limited to, dimethyltin oxide, diethyltin oxide, dibutyltin oxide, dioctyltin oxide, diphenyltin oxide, dimethyltin sulfide, dipropyltin sulfide, dibutyltin sulfide, dioctyltin sulfide, dimethyltin diacetate, dimethyltin dibutyrate, dimethyltin dioctanoate, dibutyltin diacetate, dibutyltin dioctanoate, dibutyltin dilaurate, dibutyltin distearate, 1,3-diacetoxy-1,1,3,3-tetrabutyldistannoxane, 1,1,3,3-tetrabutyl-1,3-diphenoxydistannoxane, 1,1,3,3-tetrabutyl-1,3-dilauroyloxydistannoxane, 1,3-diacetoxy-1,1,3,3-tetrabutylstannathiane, 1,3-di-2-ethylhexanoyloxy-1,1,3,3-tetramethyldistannathiane, dioctyltin diacetate, dioctyltin dioctanoate, dioctyltin dilaurate, diphenyltin diacetate, diphenyltin dilaurate, monomethyltin oxide, monobutyltin oxide, monooctyltin oxide, monophenyltin oxide, monomethyltin monoacetate, monomethyltin monooctanoate, monobutyltin monoacetate, monobutyltin monooctanoate, monobutyltin monolaurate, monooctyltin monoacetate, monooctyltin monolaurate, monophenyltin monoacetate, monomethyltin trilaurate, monobutyltin triacetate, monobutyltin trioctanoate, monobutyltin trilaurate, monobutyltin tristearate, monooctyltin triacetate, monooctyltin trilaurate, monophenyltin triacetate, monophenyltin trioctanoate and monophenyltin trilaurate.

The organotin compounds mentioned above may be used alone or, if desired, in combination of at least two of such compounds.

The morpholine compound usable in combination with these organotin compounds include, but is not limited to, morpholine, N-methylmorpholine, N-ethylmorpholine, morpholinoethanol, N-aminomorpholine, N-(2-aminoethyl)morpholine, N-phenylmorpholine, N-p-acetoxyphenylmorpholine, N-o-acetoxyphenylmorpholine and N-p-aminophenylmorpholine.

Examples of the piperidine compound are, but are not limited to, N-ethyl-3-hydroxypiperidine, 2,2,6,6-tetramethyl-4-hydroxypiperidine, N-(2-hydroxyethyl)-piperidine, N-hydroxypiperidine, 4-phenylpiperidine, 4-amino-N-benzylpiperidine, N-(2-aminoethyl)piperidine, 4-amino-2,2,6,6-tetramethylpiperidine and 4-benzylpiperidine.

Examples of the alkanolamine compound of formula (I) are, but are not limited to, ethanolamine, diethanolamine, triethanolamine, N-methyldiethanolamine, N-ethyldiethanolamine, N-butyldiethanolamine, N,N-dibutylethanolamine, N-phenyldiethanolamine, N-phenyl-N-ethylethanolamine, N-phenylethanolamine, N-(2-aminoethyl)ethanolamine, N,N-diethylethanolamine and N,N-dimethylethanolamine.

The amine compounds are generally used in an amount of 1–50% by weight based on the dialkyltin compound, diaryltin compound, monoalkyltin compound and monoaryltin compound, but such amount may vary depending upon the compounds employed.

Greater amounts of the organotin compounds as the catalysts in accordance with the invention make the polyurethane formation reaction proceed smoothly at lower temperatures. Generally, however, they are used in an amount of 0.1–5%, preferably 0.1–1%, by weight based on the active hydrogen-containing compound.

The present invention can be applied to the preparation of polyurethane coating compositions such as powder coating compositions and cathodically electrodepositable coating compositions by using blocked isocyanate compounds.

In the case of a cathodically electrodepositable coating composition, for example, a reaction product of a blocked isocyanate compound and an active hydrogen-containing compound is solubilized and then the resulting composition is polymerized in the presence of the catalyst system of the present invention and other necessary constituents (e.g. pigments or extenders) to give a coating composition. Such a technique is well known in the art, and will be definitely shown in the following examples.

The combined use of the specific organotin compounds and the specific amine compounds in accordance with the present invention advantageously lowers the baking temperature and gives cured coatings with a smooth surface and good performance.

The following examples are illustrative of the present invention, but they are not to be construed as limiting the invention. "Part(s)" means "part(s) by weight".

EXAMPLE 1

To a mixture of 30.6 parts of a preferably blocked isocyanate (available from Takeda Chemical Industries, Ltd. under the trademark "Takenate B-830") and 20 parts of a polyester polyol (available from Takeda Chemical Industries, Ltd. under the trademark "Takelac U-27") are added 0.1 part of 1,1,3,3-tetrabutyl-1,3-diacetoxystannoxane and a specified amount of the amine compound as mentioned in Table 1 or 2. The resulting mixture is applied to steel sheets and the coatings are baked in an electric oven at different temperatures for 30 minutes. The results thus obtained are shown in Tables 1 and 2, wherein the symbol + indicates complete cure; the symbol ± means that the coating has been cured but is till sticky; and the symbol − indicates that the coating has not been cured yet.

TABLE 1

| Catalyst (Amount, part) | | Baking temperature | | |
|---|---|---|---|---|
| Tetrabutyl-1,3-di-acetoxydistannoxane | 1,10-Phenan-throline | 120° C. | 130° C. | 140° C. |
| The Invention | | | | |
| 0.1 | 0.004 | ± | + | + |
| 0.1 | 0.008 | ± | + | + |
| 0.1 | 0.012 | ± | + | + |
| For Comparison | | | | |
| 0.1 | 0 | − | − | ± |

TABLE 2

| Catalyst (Amount, part) | | Baking temperature | | |
|---|---|---|---|---|
| Tetrabutyl-1,3-di-acetoxydistannoxane | 2,2′-Bipyridyl | 120° C. | 130° C. | 140° C. |
| The Invention | | | | |
| 0.1 | 0.004 | − | ± | + |
| 0.1 | 0.008 | − | ± | + |
| 0.1 | 0.012 | ± | + | + |
| For Comparison | | | | |
| 0.1 | 0 | − | − | ± |

EXAMPLE 2

A mixture of 500 parts of a condensation product of epichlorohydrin and bisphenol A, having an epoxy equivalent of 500 (available from Shell Chemical Co. under the trademark "EPON 1001") and 100 parts of toluene is heated to 80°–100° C. to complete dissolution. Then, 73 parts of diethylamine is added dropwise at 80°–100° C. with stirring. After the addition, the mixture is heated at 120° C. for 2 hours with stirring. Thereafter, 280 parts of a fatty acid mixture derived from dehydrated castor oil is added. The mixture is heated under reflux at 200° C. for 5 hours while removing water formed. The toluene is then distilled off under reduced pressure. After cooling to 100° C., 300 parts of butyl acetate is added. While stirring at 100° C., 264 parts of a partially blocked diisocyanate prepared by adding dropwise 90 parts of 2-ethoxyethanol to 174 parts of tolylene diisocyanate (a mixture of 80% of 2,4-isomer and 20% of 2,6-isomer) at 60° C. over 2 hours with stirring under nitrogen and stirring the resulting mixture at 60° C. for 2 hours is added dropwise at 100° C. over 1–1.5 hours. After the addition, the mixture is heated at 120° C. for 2 hours with stirring. After cooling to 50°–60° C., 60 parts of acetic acid and 1,365 parts of deionized water are added with stirring. There is thus obtained a 40% base emulsion for preparing an electrodepositable coating composition.

An electrodepositable coating composition is prepared by mixing 100 parts of the 40% base emulsion prepared above, 6 parts of red iron oxide, 6 parts of titanium white and the dialkyltin, diaryltin, monoalkyltin or monoaryltin compound and amine compound as shown in Tables 3–11 each in a specified amount in a ball mill for 20 minutes and then adding 288 parts of deionized water. The composition has a solid content of 13% and a pH of 5.5–6.

The coating composition prepared in this manner is electrodeposited on a degreased steel sheet at a voltage of 50 V for a minute. The coated sheet is rinsed with tap water, predried at 80° C. for 10 minutes and baked in an electric oven for 20 minutes.

The results obtained are summarized in Tables 3–11. The symbols in the tables, namely +, ± and −, are as defined in Example 1.

TABLE 3

| Catalyst | | | Baking temperature (°C.) | | | |
|---|---|---|---|---|---|---|
| Organotin compound (Amount, part) | | 1,10-Phenan-throline (Amount, part) | 160 | 170 | 180 | 190 |
| Dibutyltin oxide | 0.1 | 0 | − | − | + | |
| | | 0.004 | + | + | + | |
| | | 0.02 | + | + | + | |
| | | 0.04 | + | + | + | |
| Tetrabutyl-1,3-diacetoxy-distannoxane | 0.1 | 0 | − | − | + | |
| | | 0.004 | − | + | + | |
| | | 0.02 | − | + | + | |
| | | 0.04 | + | + | + | |
| | | 0 | − | − | − | + |

TABLE 3-continued

| Catalyst | | Baking temperature (°C.) | | | |
|---|---|---|---|---|---|
| Organotin compound (Amount, part) | 1,10-Phenanthroline (Amount, part) | 160 | 170 | 180 | 190 |
| Dibutyltin dilaurate 0.1 | 0.004 | − | − | − | + |
| | 0.02 | − | − | + | + |
| | 0.04 | − | ± | + | + |
| | 0 | − | − | + | + |
| Diphenyltin oxide 0.1 | 0.004 | − | + | + | |
| | 0.02 | + | + | + | |
| | 0.04 | + | + | + | |
| | 0 | − | − | + | |
| Tetrabutyl-1,3-diphenoxydistannathiane 0.1 | 0.004 | − | ± | + | |
| | 0.02 | − | ± | + | |
| | 0.04 | ± | + | + | |

TABLE 4

| Catalyst | | Baking temperature (°C.) | | | |
|---|---|---|---|---|---|
| Organotin compound (Amount, part) | 1,10-Phenanthroline (Amount, part) | 150 | 160 | 170 | 180 |
| | 0 | − | − | + | |
| Monobutyltin Oxide 0.1 | 0.004 | − | + | + | |
| | 0.008 | − | + | + | |
| | 0.012 | − | + | + | |
| | 0 | − | − | ± | + |
| Monophenyltin Oxide 0.1 | 0.004 | − | ± | + | + |
| | 0.008 | − | + | + | |
| | 0.012 | − | + | + | |
| Monobutyltin Oxide 0.08 | 0 | − | − | ± | + |
| | 0.004 | − | − | ± | + |
| Tetrabutyl-1,3-diacetoxydistannoxane 0.02 | 0.008 | − | + | + | + |
| | 0.012 | − | + | + | + |
| No addition (For comparison) | 0.004 | − | − | − | − |
| | 0.008 | − | − | − | − |
| | 0.012 | − | − | − | − |
| | 2.0 | − | − | − | − |

TABLE 5

| Catalyst | | Baking temperature (°C.) | | | |
|---|---|---|---|---|---|
| Organotin compound (Amount, part) | 2,2'-Bipyridyl (Amount, part) | 160 | 170 | 180 | 190 |
| | 0 | − | − | + | |
| Dibutyltin oxide 0.1 | 0.004 | − | + | + | |
| | 0.02 | + | + | + | |
| | 0.04 | + | + | + | |
| | 0 | − | − | − | + |
| Dibutyltin dilaurate 0.1 | 0.004 | − | − | ± | + |
| | 0.02 | − | ± | + | + |
| | 0.04 | − | ± | + | + |
| | 0 | − | − | ± | + |
| Diphenyltin oxide 0.1 | 0.004 | − | ± | + | + |
| | 0.02 | ± | + | + | + |
| | 0.04 | + | + | + | + |

TABLE 6

| Catalyst | | Baking temperature (°C.) | | | |
|---|---|---|---|---|---|
| Organotin compound (Amount, part) | 2,2'-Bipyridyl (Amount, part) | 150 | 160 | 170 | 180 |
| | 0 | − | − | + | |
| Monobutyltin oxide 0.1 | 0.004 | − | + | + | |
| | 0.008 | − | + | + | |
| | 0.012 | − | + | + | |
| | 0 | − | − | ± | + |

TABLE 6-continued

| Catalyst | | Baking temperature (°C.) | | | |
|---|---|---|---|---|---|
| Organotin compound (Amount, part) | 2,2'-Bipyridyl (Amount, part) | 150 | 160 | 170 | 180 |
| Monophenyltin oxide 0.1 | 0.004 | − | ± | + | + |
| | 0.008 | − | + | + | |
| | 0.012 | − | + | + | |
| Monobutyltin oxide 0.08 | 0 | − | − | ± | + |
| | 0.004 | − | − | ± | + |
| Tetrabutyl-1,3-diacetoxydistannoxane 0.02 | 0.008 | − | ± | + | + |
| | 0.012 | − | + | + | + |
| No addition (For comparison) | 0.004 | − | − | − | − |
| | 0.008 | − | − | − | − |
| | 0.012 | − | − | − | − |
| | 2.0 | − | − | − | − |

TABLE 7

| Catalyst | | Baking temperature (°C.) | | | | |
|---|---|---|---|---|---|---|
| Organotin compound (Amount, part) | 4,4'-Dimethyl-2,2'-bipyridyl (Amount, part) | 160 | 165 | 170 | 175 | 180 |
| | 0 | − | − | − | − | + |
| Dibutyltin oxide 0.1 | 0.004 | − | − | ± | + | + |
| | 0.02 | ± | + | + | + | + |
| | 0.04 | + | + | + | + | + |
| Tetrabutyl-1,3-diacetoxydistannoxane 0.1 | 0 | − | − | − | − | ± |
| | 0.004 | − | − | − | ± | ± |
| | 0.02 | − | − | ± | + | |
| | 0.04 | − | − | ± | + | + |
| Diphenyltin oxide 0.1 | 0 | − | − | − | − | ± |
| | 0.004 | − | − | ± | + | + |
| | 0.02 | − | ± | + | + | + |
| | 0.04 | + | + | + | + | + |
| Dibutyltin oxide 0.08 Monophenyltin oxide 0.02 | 0 | − | − | − | ± | + |
| | 0.004 | ± | + | + | + | + |
| | 0.02 | + | + | + | + | + |
| | 0.04 | + | + | + | + | + |
| Dibutyltin oxide 0.08 Monobutyltin oxide 0.02 | 0 | − | − | − | + | + |
| | 0.004 | ± | + | + | + | + |
| | 0.02 | + | + | + | + | + |
| | 0.04 | + | + | + | + | + |

TABLE 8

| Catalyst | | Baking temperature (°C.) | | | | |
|---|---|---|---|---|---|---|
| Organotin compound (Amount, part) | 2,4,6-Tris-(Dimethylaminomethyl)Phenol (Amount, part) | 160 | 165 | 170 | 175 | 180 |
| | 0 | − | − | − | − | + |
| Dibutyltin oxide 0.1 | 0.004 | − | − | ± | + | + |
| | 0.02 | ± | + | + | + | + |
| | 0.04 | + | + | + | + | + |
| Tetrabutyl-1,3-diacetoxydistannoxane 0.1 | 0 | − | − | − | − | ± |
| | 0.004 | − | − | − | − | ± |
| | 0.02 | − | − | − | ± | + |
| | 0.04 | − | − | ± | + | + |
| Diphenyltin oxide 0.1 | 0 | − | − | − | − | ± |
| | 0.004 | − | − | ± | + | + |
| | 0.02 | − | ± | + | + | + |
| | 0.04 | + | + | + | + | + |
| Dibutyltin oxide 0.08 Monophenyltin oxide 0.02 | 0 | − | − | − | ± | + |
| | 0.004 | − | ± | + | + | + |
| | 0.02 | + | + | + | + | + |
| | 0.04 | + | + | + | + | + |
| Dibutyltin oxide 0.08 Monobutyltin oxide 0.02 | 0 | − | − | − | ± | + |
| | 0.004 | − | ± | + | + | + |
| | 0.02 | + | + | + | + | + |
| | 0.04 | + | + | + | + | + |

TABLE 9

| Catalyst | | | | Baking temperature (°C.) | | | | |
|---|---|---|---|---|---|---|---|---|
| Organotin compound (Amount, part) | | Morpholine compound (Amount, part) | | 160 | 165 | 170 | 175 | 180 |
| Dibutyltin oxide | 0.3 | Morpholine | 0 | − | − | − | − | + |
| | | | 0.012 | − | − | + | + | + |
| | | | 0.06 | − | + | + | + | + |
| Dibutyltin oxide | 0.3 | N-Methylmorpholine | 0 | − | − | − | − | + |
| | | | 0.012 | − | − | − | + | + |
| | | | 0.06 | − | − | + | + | + |
| Dibutyltin oxide | 0.3 | Morpholinoethanol | 0 | − | − | − | − | + |
| | | | 0.012 | − | − | − | + | + |
| | | | 0.06 | − | − | + | + | + |
| Dibutyltin oxide | 0.3 | N-Ethylmorpholine | 0 | − | − | − | − | + |
| | | | 0.012 | − | − | − | + | + |
| | | | 0.06 | − | − | + | + | + |
| Dibutyltin oxide | 0.3 | N-(2-Aminiethyl)-morpholine | 0 | − | − | − | − | + |
| | | | 0.012 | − | − | − | + | + |
| | | | 0.06 | − | − | + | + | + |
| Dibutyltin oxide / Monobutyltin oxide | 0.24 / 0.06 | Morpholine | 0 | − | − | − | − | + |
| | | | 0.012 | − | + | + | + | |
| | | | 0.06 | − | + | + | + | |
| Dibutyltin oxide / Monophenyltin oxide | 0.24 / 0.06 | Morpholinoethanol | 0 | − | − | − | + | |
| | | | 0.12 | − | − | + | + | |
| | | | 0.06 | − | + | + | + | |
| Tetrabutyl-1,3-diacetoxydistannoxane | 0.3 | N-Methylmorpholine | 0 | − | − | − | − | + |
| | | | 0.012 | − | − | − | + | + |
| | | | 0.06 | − | − | + | + | + |

TABLE 10

| Catalyst | | | | Baking temperature (°C.) | | | | |
|---|---|---|---|---|---|---|---|---|
| Organotin compound (Amount, part) | | Piperidine compound (Amount, part) | | 160 | 165 | 170 | 175 | 180 |
| Dibutyltin oxide | 0.3 | 2,2,6,6-Tetramethyl-4-hydroxypiperidine | 0 | − | − | − | − | + |
| | | | 0.012 | − | − | + | + | + |
| | | | 0.06 | − | − | + | + | + |
| Dibutyltin oxide | 0.3 | N-Ethyl-3-hydroxy-piperidine | 0 | − | − | − | − | + |
| | | | 0.012 | − | − | + | + | + |
| | | | 0.06 | − | − | + | + | + |
| Dibutyltin oxide | 0.3 | N-(2-hydroxyethyl)-piperidine | 0 | − | − | − | − | + |
| | | | 0.012 | − | − | − | + | + |
| | | | 0.06 | − | − | + | + | + |
| Dibutyltin oxide / Monobutyltin oxide | 0.24 / 0.06 | 2,2,6,6-Tetramethyl-4-hydroxypiperidine | 0 | − | − | − | − | + |
| | | | 0.012 | − | − | + | + | |
| | | | 0.06 | − | + | + | + | |
| Dibutyltin oxide / Monophenyltin oxide | 0.24 / 0.06 | N-Ethyl-3-hydroxy-piperidine | 0 | − | − | − | + | |
| | | | 0.012 | − | − | + | + | |
| | | | 0.06 | − | + | + | + | |

TABLE 11

| Catalyst | | | | Baking temperature (°C.) | | | | |
|---|---|---|---|---|---|---|---|---|
| Organotin compound (Amount, part) | | Alkanolamine compound (Amount, part) | | 160 | 165 | 170 | 175 | 180 |
| Dibutyltin oxide | 0.3 | Triethanolamine | 0 | − | − | − | − | + |
| | | | 0.012 | − | − | + | + | + |
| | | | 0.06 | − | + | + | + | + |
| Dibutyltin oxide | 0.3 | N-(2-Aminoethyl)-ethanolamine | 0 | − | − | − | − | + |
| | | | 0.012 | − | − | + | + | + |
| | | | 0.06 | − | − | + | + | + |
| Dibutyltin oxide | 0.3 | N,N-Dimethyl-ethanolamine | 0 | − | − | − | − | + |
| | | | 0.012 | − | − | + | + | + |
| | | | 0.06 | − | − | + | + | + |
| Dibutyltin oxide | 0.3 | N-Phenyl-N-ethyl-ethanolamine | 0 | − | − | − | − | + |
| | | | 0.012 | − | − | − | + | + |
| | | | 0.06 | − | − | + | + | + |
| Dibutyltin oxide | 0.3 | Diethanolamine | 0 | − | − | − | − | + |
| | | | 0.012 | − | − | + | + | + |
| | | | 0.06 | − | − | + | + | + |
| Dibutyltin oxide | 0.3 | Ethanolamine | 0 | − | − | − | − | + |
| | | | 0.012 | − | − | + | + | + |
| | | | 0.06 | − | − | + | + | + |
| Dibutyltin oxide | 0.3 | N,N-Diethyl-ethanolamine | 0 | − | − | − | − | + |
| | | | 0.012 | − | − | − | + | + |
| | | | 0.06 | − | − | + | + | + |
| Dibutyltin oxide | 0.24 | Triethanolamine | 0 | − | − | − | + | |
| | | | 0.012 | − | + | + | + | |

TABLE 11-continued

| Catalyst | | | | | Baking temperature (°C.) | | | | |
|---|---|---|---|---|---|---|---|---|---|
| Organotin compound | | Alkanolamine compound | | | 160 | 165 | 170 | 175 | 180 |
| (Amount, part) | | (Amount, part) | | | | | | | |
| Monobutyltin oxide | 0.06 | | 0.06 | | − | + | + | + | |
| | | | 0 | | − | − | − | + | |
| Dibutyltin oxide | 0.24 | N,N-Dimethyl- | 0.012 | | − | + | + | + | |
| Monophenyltin oxide | 0.06 | ethanolamine | 0.06 | | − | + | + | + | |
| | | | 0 | | − | − | − | − | + |
| Dibutyltin dilaurate | 0.3 | Triethanolamine | 0.012 | | − | − | − | + | + |
| | | | 0.06 | | − | − | + | + | + |

What is claimed is:

1. A method of producing polyurethanes which comprises reacting an at least partially blocked isocyanate compound with an active hydrogen-containing compound in the presence of at least one compound selected from the group consisting of dialkyltin, diaryltin, monoalkyltin and monoaryltin compounds, and at least one amine compound selected from the group consisting of 1,10-phenanthroline, bipyridyl, 4,4'-dimethyl-2,2'-bipyridyl, 2,4,6-tris(dimethylaminomethyl)phenol, a morpholine compound, a piperidine compound and an alkanolamine compound of the formula $(R)_{3-n}N(CH_2CH_2OH)_n$ wherein R is a hydrogen atom, a lower alkyl group having 1 to 4 carbon atoms, a phenyl group or a group of the formula $-(CH_2)_mNH_2$ in which m is an integer of 1 to 8, and n is an integer of 1 to 3 and wherein, when n is an integer of 1, the two Rs may be the same or different.

2. A method according to claim 1, wherein the dialkyltin compound is selected from the group consisting of dibutyltin oxide, 1,1,3,3-tetrabutyl-1,3-diacetoxydistannoxane and dibutyltin dilaurate.

3. A method according to claim 1, wherein the diaryltin compound is diphenyltin oxide.

4. A method according to claim 1, wherein the monoalkyltin compound is monobutyltin oxide.

5. A method according to claim 1, wherein the monoaryltin compound is monophenyltin oxide.

6. A method according to claim 1, wherein the amine compound is 1,10-phenanthroline.

7. A method according to claim 1, wherein the amine compound is bipyridyl.

8. A method according to claim 1, wherein the amine compound is 4,4'-dimethyl-2,2'-bipyridyl.

9. A method according to claim 1, wherein the amine compound is 2,4,6-tris(dimethylaminomethyl)phenol.

10. A method according to claim 1, wherein the amine compound is a morpholine compound.

11. A method according to claim 1, wherein the amine compound is a piperidine compound.

12. A method according to claim 1, wherein the amine compound is an alkanolamine compound.

* * * * *